United States Patent [19]
Scott, Jr. et al.

[11] Patent Number: 5,168,678
[45] Date of Patent: Dec. 8, 1992

[54] MODULAR LANDSCAPING SYSTEM AND STRUCTURES

[75] Inventors: Harry W. Scott, Jr., Dover; Randall W. Britt; Kenneth L. Renfroe, both of Russellville; Robert L. Ramsey; J. Marlin Deaver, both of Morrilton; Brooks A. Morton, Pottsville, all of Ark.

[73] Assignee: Thompson Industries, Inc., Russellville, Ark.

[21] Appl. No.: 788,986

[22] Filed: Nov. 7, 1991

[51] Int. Cl.⁵ .............................................. A01G 1/00
[52] U.S. Cl. .......................................... 52/102; 47/33
[58] Field of Search .................. 52/102, 71, 285, 587, 52/593, 596, 603, 604, 582, DIG. 2, 227, 228; 47/33; 256/60, 65, 26, 25, 1

[56] References Cited

U.S. PATENT DOCUMENTS

| | | | |
|---|---|---|---|
| 218,047 | 7/1879 | Millar | 256/25 |
| 1,649,780 | 11/1927 | Robbins | 52/604 |
| 3,295,269 | 1/1967 | Schuster | 52/227 |
| 3,296,758 | 1/1967 | Knudsen | 52/227 |
| 3,343,301 | 9/1967 | Adelman | 47/33 |
| 3,438,146 | 4/1969 | Nickerson | 47/33 |
| 3,484,081 | 12/1969 | Rowan | 256/25 |
| 4,733,851 | 3/1988 | Weiss | 256/60 |
| 4,753,036 | 6/1988 | Konno | 47/59 |
| 4,869,018 | 9/1989 | Scales et al. | 47/48.5 |
| 4,905,409 | 3/1990 | Cole | 47/33 |

FOREIGN PATENT DOCUMENTS

588302  5/1947  United Kingdom ........... 52/DIG. 2

Primary Examiner—David A. Scherbel
Assistant Examiner—Michele A. Van Patten
Attorney, Agent, or Firm—Stephen D. Carver

[57] ABSTRACT

A system for constructing landscape structures and bordering, landscape retaining walls, landscape modules, and planting structures of varying sizes, layers, and configurations, including modules and walls built from said system. Landscaping structures including modules, fences, walls and the like are custom erected at the job site from groups of component lanscaping logs of assorted lengths that are machined to interlock with cooperating male and female ends. The preferred landscaping log comprises a central body that is generally in the form of a parallelpiped having a square cross section. Each log comprises spaced apart male and female ends. The female end comprises a pair of apertured, spaced-apart flanges with a receptive notch defined therebetween. The male end comprises an apertured, outwardly projecting, flange adapted to be inserted within the receptive notch. Aligned flange orifices are penetrated by properly sized dowels to pivotally lock the logs and layers of logs together and anchor the various modules and wall structures through their joints to the ground, thus forming a variety of landscaping units and structures. Male and female terminators attachable to the logs provide a graduated termination, and compensate for irregular terrain. A bench is provided for coupling between similar modules. Numerous multi-layer, polygonal landscaping modules, edgings, buildings, enclosures, and fences can be custom formed. A deadman adaptation is provided for reinforcing wall sections.

19 Claims, 6 Drawing Sheets

MODULAR LANDSCAPING SYSTEM AND STRUCTURES

BACKGROUND OF THE INVENTION

This invention relates to modular systems for constructing esthetically pleasing landscaping structures. More particularly it relates to an improved modular landscaping system enabling the custom erection of landscaping edging, walkways, planter boxes, raised-bed gardens, retaining walls, slope terracing, and a wide variety of landscaping structures.

In recent years do-it-yourself landscaping projects have grown in popularity. A properly completed landscaping project can beautify the homeowner's property, magnify the owner's enjoyment of the property, and increase the sale value of the home. Typical landscaping projects involve edging around trees, walks, and drives, and the construction of enclosed planters for flower beds. Some applications require sloped ground to be leveled by terracing which is accomplished by building retaining walls at intervals downhill from one another. The majority of landscaping projects are hampered by the very limited selection of materials available to the homeowner. Common choices for landscaping include railroad cross ties or plywood "peeler cores."

Railroad cross ties are frequently available as "used" ties that have been removed from service by the railroad because of excessive wear or decay. Cross ties are generally six or seven inches thick, eight to nine inches wide, and eight to nine feet long. Their large size, and the fact that they are usually made of hardwood, makes them very heavy and difficult to handle. Cross ties are typically treated with a creosote oil solution that also soils clothing and tools. The standard length of cross ties makes them inconvenient and cumbersome for normal home landscaping projects. For many projects cutting is required. Cross ties are also difficult to join in the corners.

Peeler cores are formed by machining a log section through a veneer lathe. Such cores are typically four to six inches in diameter and eight feet long. Normally the peeler core is sawed full length to remove a small slab along one side, leaving approximately a two inch wide flat surface. This operation is repeated along the opposite side of the peeler core such that the final piece has parallel flat surfaces top and bottom allowing them to be more easily stacked.

Prior art landscaping timbers are usually pressure treated with preservative. Proper treating requires the timber to be kiln dried or air dried to allow for adequate penetration and retention of the preservative. Most often these timbers are not properly dried prior to treatment, and they typically contain a very large percentage of heartwood that will not accept preservative even when properly dried. The resulting product is sold as a "treated wood landscape timber," but it does not carry warranty protection as do most properly treated wood products. Under normal use circumstances where the timber is in direct contact with the earth, the improper treatment generally offers little more life than untreated wood products.

Normal timbers are available in standard lengths of eight feet. Projects needing shorter pieces require that the timber be cut. This difficult task is usually performed with a chain saw and results in breaking the thin envelope of protection provided by the improper treatment. These timbers are deficient when forming corners or angular intersections. They are usually spiked together with large nails, or drilled and linked using pipe or similar materials.

Known prior art patents are as follows:

| | | |
|---|---|---|
| 1,219,786 | Splater | Mar. 20, 1917 |
| 1,809,508 | Colby | June 9, 1931 |
| 2,687,033 | Snyder | Aug. 24, 1954 |
| 2,951,606 | Benson | Sep. 6, 1960 |
| 3,324,619 | Gearhart | June 13, 1967 |
| 3,487,579 | Brettingen | Jan. 6, 1970 |
| 3,545,128 | Fontaine | Dec. 8, 1970 |
| 3,742,665 | Henry | July 3, 1973 |
| 4,312,606 | Sarikelle | Jan. 26, 1982 |
| 4,353,191 | Schilbe | Oct. 12, 1982 |
| 4,391,077 | Giess | July 5, 1983 |
| 4,433,944 | Plica | Feb. 28, 1984 |
| 4,747,231 | Lamay | May 31, 1988 |
| 4,761,923 | Reum | Sep. 9, 1988 |
| 4,834,585 | Hasenwinkle | May 30, 1989 |
| 4,897,955 | Winsor | Feb. 6, 1990 |
| 4,910,910 | Jones | Mar. 27, 1990 |
| 4,967,526 | Yost | Nov. 6, 1990 |
| 4,997,316 | Rose | Mar. 5, 1990 |

The prior art mentioned above reveals the broad utility concept of a timber locking system. Giess U.S. Pat. No. 4,391,077 teaches the desirability of providing a construction timber with interlocking tongue and grove connectors. The timbers are secured together by locking pins or dowels, and can be linked at various angular dispositions. Earlier patents issued to Snyder and Henry disclose building components provided with notched ends to facilitate interlocking of adjacent logs. The grain tank disclosed by Splater in U.S. Pat. No. 1,219,786 is constructed of a plurality of interlocking timbers, wherein each timber comprises an outwardly projecting end piece or tongue adapted to fit within a corresponding groove. When the boards are connected a pin penetrates locking orifices of the tongues. Similar structure is disclosed by Benson in U.S. Pat. No. 2,951,606.

Weyerhauser U.S. Pat. No. 4,834,585, sets forth drilled landscape timbers that can be angularly disposed relative to one another to form a curved retaining surface. Fontaine U.S. Pat. No. 3,545,128 discloses a corner element that can be coupled to landscape timbers to form corners. Sarikelle U.S. Pat. No. 4,312,606 discloses a retaining wall structure comprised of a plurality of timbers having interlocking post members.

However, the prior art products fail to provide an overall system as described herein which synergistically accomplishes all of the objects and advantages of our system. Peeler core landscape timbers that have been cut and drilled prior to treatment are inconvenient with pins or dowels when stacked. Square timbers have been drilled for attachment in straight lines at ninety degree corners, but they do not provide a workable system that accommodates intermediate angles. None of the known inventions have provided timbers that form connections that allow for any angle of attachment through one hundred eighty degrees of arc.

SUMMARY OF THE INVENTION

Our invention comprises a system for constructing landscaping structures including landscape bordering, retaining walls, flower or planter boxes, and numerous other modular structures. The wooden structures are built from a plurality of fitted logs that are securely linked together, and disposed in various arrays of selected layers. Sized modules erected with the system are machined to interlock at corners. Corners of the modules are firmly anchored to the ground. Module components are flexibly jointed together, and a firm anchor is established at the pivot point. Sized rods lock the members together and anchor the modules to the ground to form a variety of thoroughly braced landscaping units and structures. The present invention, in its preferred embodiment, comprises properly preserved, treated timber logs that can be connected at any angle through one hundred and eighty degrees of arc.

The preferred landscaping log comprises a central body that is generally in the form of a parallelepiped. All the logs are preferably machined from treated Southern yellow pine. Each log comprises spaced apart, male and female opposite ends. To form a joint, individual male ends from one log are fastened within the female end of another log. Resultant joints or corners can be angled as desired, for example, to form bordering or walls of non-standard sizes and shapes. Alternatively, a plurality of structures of a regular or irregular geometric shape, such as polygonal planter modules, can be similarly erected. The male and female flanges are properly radiused to promote quick coupling. The logs are nominally formed in lengths from two to eight feet.

Each female log end comprises a pair of spaced apart flanges separated by a receptive volume into which a corresponding male flange is inserted. Each flange comprises coupling orifices adapted to be aligned with one another. When abutting log ends are positioned and aligned properly during construction, a rod is driven through them to form a corner or joint. When building retaining walls, the rod comprises a metal spike; when decorative modules are constructed on dry land, a wooden dowel is preferred. When the dowel (or pipe) is installed, it may be driven into the ground to permanently brace the module. A protective wooden cap may be inserted over the dowel end for decoration and to seal out foreign objects and water from the joint. Stacked logs may all be fastened in desired laybe fastened in desired layers by a single dowel or pipe of appropriate length, and a corner or joint results between the coupled sections. The corner of a given module may comprise numerous layers, each comprising pairs of fitted, log ends.

Terminator members contemplated by our system terminate in male or female ends, with wedges defined at the opposite ends. These male and female terminators may be joined to other logs with similar male and female ends to form gradual transitions. They may similarly be doweled and capped. When disposed at the bottom of a section or array of landscape logs, they adapt the structure for irregular terrain. Fences, and modules comprised of multiple sub-modules of varying heights and configurations, retaining walls, edgings, enclosures, decorations and the like can be custom erected with a set of logs and terminators constructed as disclosed. A deadman system is disclosed for reinforcing wall sections.

Thus a broad object of our invention is to form a landscaping system that may be quickly erected in a variety of locations in a variety of shapes, sizes, and configurations.

Another broad object is to form a landscaping system that may be quickly deployed in a variety of shapes, sizes and configurations upon irregular terrain and uneven ground.

A basic object is to provide a modular system of the character described that can be employed to build modules, planters, walls, fences, edgings, and the like.

Another basic object is to provide a landscaping system of the character described which is easy and convenient to install.

Another object is to provide a highly versatile system of the character described which can be used to erect numerous different but similar structures that may be combined as desired to provide both utilitarian and aesthetic benefits.

Another important object of our invention is to provide a system of constructing a variety of different landscaping structures that can easily be built by the homeowner without special tools such as large saws or lifting equipment.

A still further object is to provide a landscaping system capable of erecting a variety of custom landscaping modules, fences, edgings, and enclosures over irregular terrain.

Yet another object is to provide a landscaping system ideally adapted for use by home gardeners and "do-it-yourself" enthusiasts.

Another object is to provide a system which provides for gradual terminations. It is a feature of our invention that logs in a given structure need not end raggedly, but they may instead end in properly shaped terminators.

A related object is to provide terminating structures that are compatible structurally and esthetically with the other components in a given installation or module.

A still further object is to provide a modular landscaping system of the character described which can be employed under water.

Another object is to provide a reinforcing system compatible structurally and esthetically with the other components in a given installation or module.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 14 is a fragmentary, partially exploded isometric view illustrates fencing constructed through with our system deployed upon sloping terrain, where spaced apart, inverted end caps provide gradual, stepping transitions upon the incline;

DETAILED DESCRIPTION OF THE DRAWINGS

With initial reference directed to FIGS. 1-5 of the appended drawings, a typical landscaping log constructed in accordance with the best mode teachings of our landscaping system has been generally designated by the reference numeral 20. As will be explained hereinafter, a variety of our landscaping logs constructed in accordance with the invention can be combined as desired at a job site to create landscaping modules, fences and borders. The logs may be of various dimensions, and preferably they are between two and ten feet long.

Figure 1:
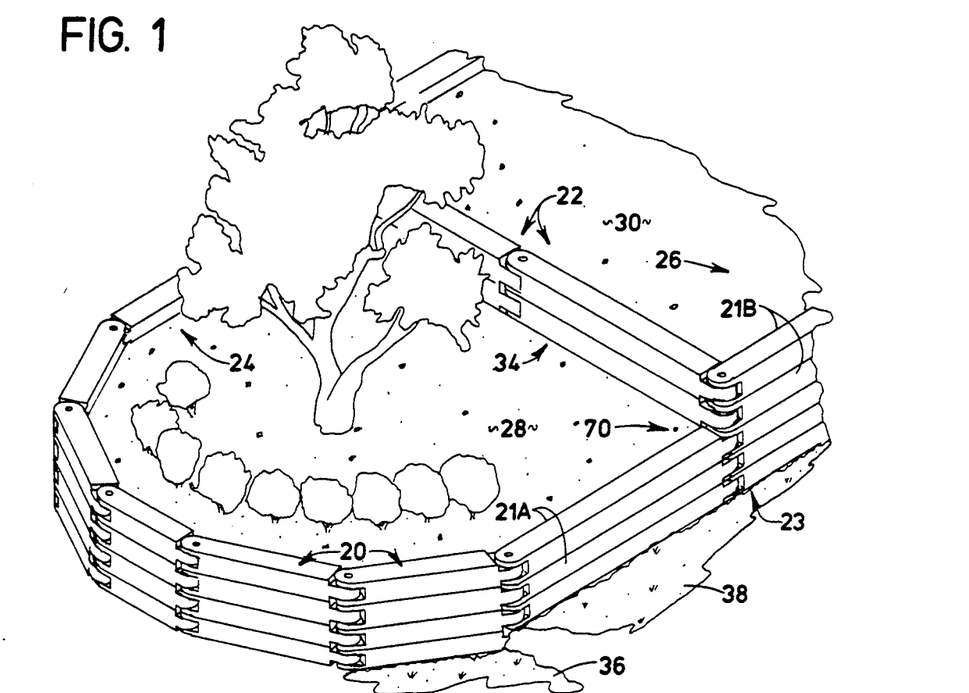
FIG. 1 is a fragmentary perspective view of custom landscaping structure erected with our landscape logs upon irregular terrain, illustrating bordering and intersecting wall sections.

A custom landscaping module built with a variety of differently configured logs has been generally designated by the reference numeral 22 in FIG. 1. The custom module 22 includes an encircling section 24 that generally encloses a region 28 of a yard to be landscaped. Region 28 is at a lower elevation than the adjacent region 30, and the two landscaped regions are separated by a multi-layer wall, multiple section 34 incorporated in custom module 22. Landscaping section 24 is built upon ground of varying height or elevation.

Ground surface region 36 is lower than adjacent region 38. As will be explained hereinafter, our landscape logs readily facilitate the design and erection of custom, decorative landscaping modules about inclined and irregular areas of varying elevation and topography. Logs 21A and 21B are arrayed in separate sections that are substantially axially aligned and are joined at a pinned joint 23 (FIG. 1). Wall section 34 is also pinned to joint 23, and it forms an angle intersecting the axis of logs 21A, 21B.

A typical timber log 20 comprises a central body 40 that is generally in the form of a parallelepiped having a generally square vertical cross section. Each log terminates at one extremity in a female end 42 and at its opposite extremity in a male end 44. When logs are coupled together individual male ends are fastened within corresponding female ends, as will hereinafter be described. The basic log 20 is preferably fabricated from solid wood. After fabrication the logs are treated with a water-proofing, preservative treatment utilizing CCA type C with a water repellent additive.

The preferred cross-sectional sizes of the logs 20 are 3.5 inches square and 5.5 inches square, which are the mill finished sizes for commercially available logs in nominal sizes 4×4, and 6×6. These logs are readily available in lengths from eight to twenty feet, and can easily be cut to preferred lengths of two, four, six and eight feet. Logs 20 are approximately four feet long. Logs 21A and 21B are respectively six and eight feet long. Other lengths can be formed if necessary.

Each female end 42 comprises a pair of spaced apart external flanges 45 separated by a receptive notch or dap 46 into which the male flange 48 may be inserted. The male and female flanges are properly radiused to promote quick coupling. The notch or "dap" 46 between the female flanges 45 internally abuts the body 40, terminating in a flat surface 47 (FIGS. 2A, 4) that occupies a plane perpendicular to the longitudinal axis of the log. The male and female flanges of the log are radiused from the extreme outermost radius point 49 to points 90 degrees to the left and the right of reference point 49. Radiusing starts at the point of curvature at radius point 49 to points ninety degrees to each other side. The dap 46 in the female end can be cut using a dado head to remove the center portion of the timber to dimensions of approximately 3.75 inches deep and approximately two inches thick to allow for a loose fit of the male flange 48.

Figure 5:
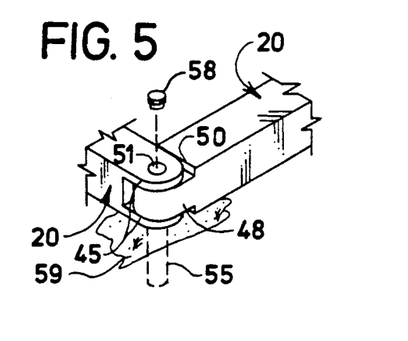
FIG. 5 is a partially exploded, fragmentary isometric view of a typical log joint, with the preferred joint pin dowel partially penetrating the ground.

Flange 48 of the male end 44 fits within notch 46 in the female end. The male end 44 is fashioned using a dado head to a thickness of approximately one inch to easily and loosely fit within dap 46, as best seen in FIG. 5. All machining is preferably accomplished by automated equipment providing high volume output as well as uniform product consistency.

Figure 2A:
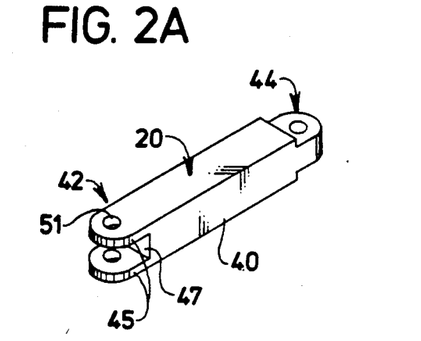
FIG. 2A is an isometric view of a typical landscaping log constructed in accordance with the best mode of our invention, with the flanged female coupling end facing the viewer.
Figure 2B:
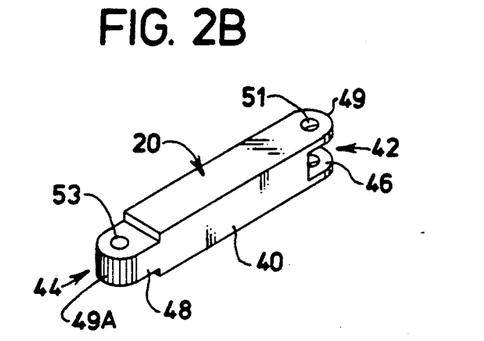
FIG. 2B is an isometric view of the landscaping log of FIG. 2A, but with the male coupling end facing the viewer.
Figure 3:
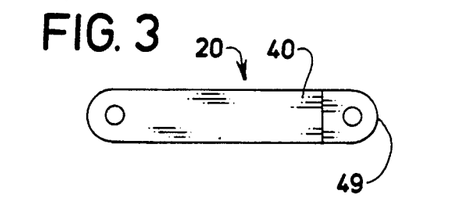
FIG. 3 is a top plan view of the landscaping log of FIG. 2A.
Figure 4:
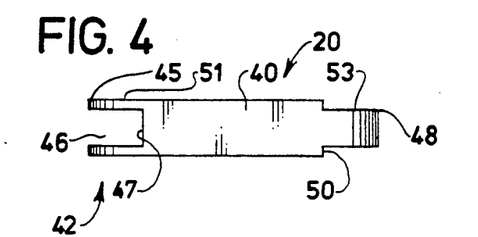
FIG. 4 is a side elevational view of the landscaping log of FIG. 2A.
Figure 4A:
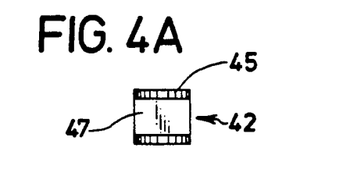
FIG. 4A is an end elevational view of the female end of the landscaping log, taken from a position generally to the left of FIG. 4.
Figure 4B:
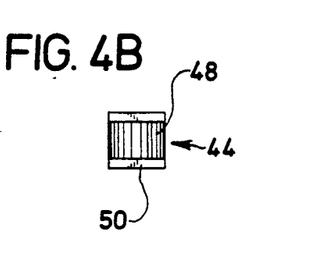
FIG. 4B is an end elevational view of the male end of the landscaping log, taken from a position generally to the right of FIG. 4.

The male flange 48 includes an outer radius point 49A. (FIG. 2B). Flange 48 adjoins the body 40 between two aligned and spaced apart shoulders 50. When the male and female ends are coupled together to form a joint (FIG. 5) shoulders 50 will be closely positioned adjacent the outer edges of the external flanges 45 of the female end 42. When logs are assembled, flat surface 47 within the female notch 46 is spaced apart from the outer radius of the male flange. At the same time, twin shoulders 50 associated with the male flange 48 are spaced apart from the radiused external flanges of the female end. This presents a uniform appearance at both sides of a joint.

The female flanges 45 include spaced apart and aligned orifices 51 adapted to be aligned with the cooperating orifices 53 defined in the male end flange 48 during assembly. Orifices 51, 53 are preferably located along the centerline of the top and bottom of log 20, spaced back from each end 1.75 inches from the radius point 49 or 49A (FIG. 2b). Orifices 51, 53 are preferably slightly greater that one inch in diameter. When abutting log ends are positioned and aligned as in FIG. 5, a rod 55 of approximately one inch diameter may be driven through them to fasten the logs. For structures built above ground the rod normally comprises a wooden dowel. A standard one inch iron pipe may be cut to length and used in place of the dowel if so desired. Preferably a pipe or spike is used for the rod where the structure is under unusual stress, or if it is at least partly submerged. When the rod is fitted, it may be driven downwardly until its end is recessed within orifice 51 (FIG. 5) approximately 0.5 inches so that a protective wooden joint pin capping button 58 may be inserted for decoration. The capping button 58 helps seal out foreign objects and water from the joint.

Figure 8:
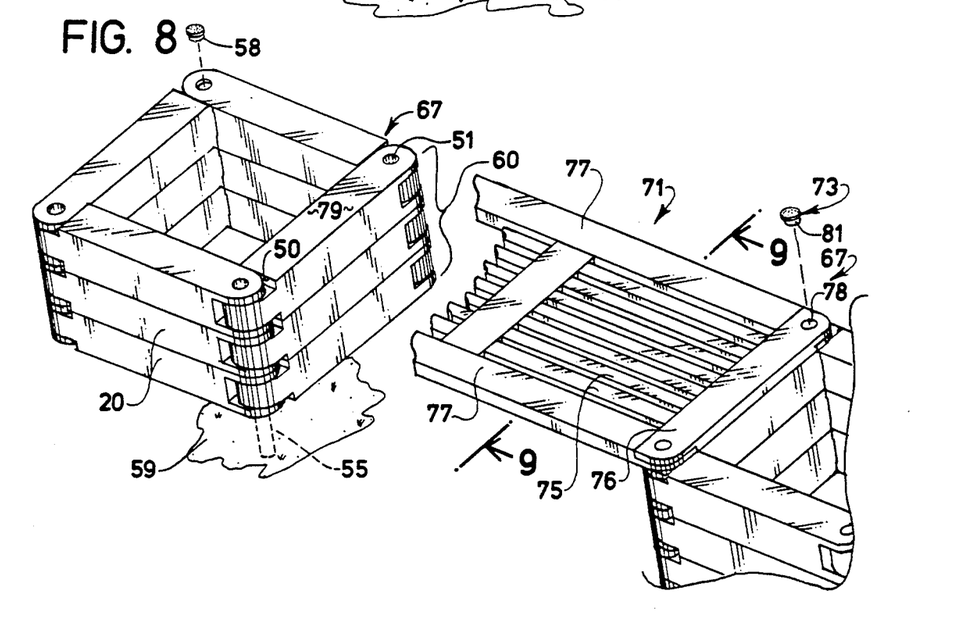
FIG. 8 is a partially fragmentary and partially exploded isometric view of a pair of "closed loop" planter box modules constructed with our landscape system, which have been joined with the preferred bench structure.
Figures 10, 11:
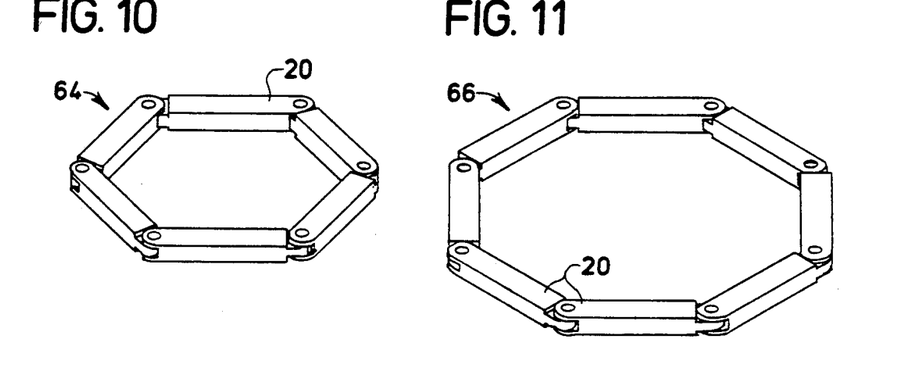
FIG. 10 is an isometric view of a hexagonal planter module constructed in accordance with the invention.
FIG. 11 is an isometric view of an octagonal module constructed in accordance with the invention.

As implied from an inspection of FIGS. 1 and 8, a plurality of aligned, stacked logs may all be fastened by a single rod of appropriate length so that a corner or joint 60 (FIG. 8) formed in a given module will consist of numerous pairs of fitted male/female ends. In this manner the strength of the module is increased since adjacent log layers are firmly secured. After the desired module pattern is developed, the rod 55 is forced through the aligned orifices to lock the separate timber logs together. As seen in FIG. 8, the coupling rod 55 may be driven into the ground 59 to provide anchoring at each joint. The angle formed between coupled logs may be any angle in a horizontal plane from ninety degrees left through ninety degrees right. Logs may be regularly, angularly positioned to form the regular polygonal modules such as the hexagonal or octagonal modules 64, 66 of FIGS. 10 and 11 respectively. As seen in FIG. 1, irregular corners 70 consisting of logs that are generally axially aligned in one layer but which are angularly intersecting in another layer may also be formed.

Figure 9:
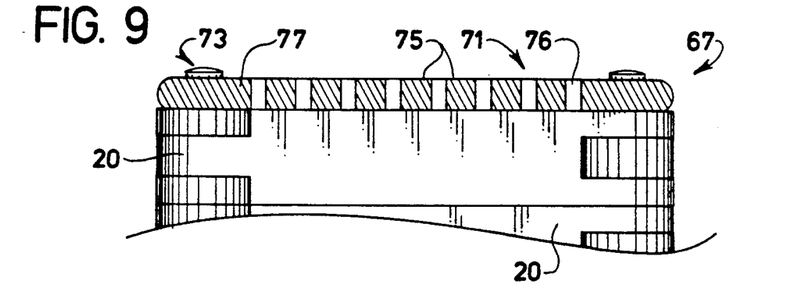
FIG. 9 is a sectional view illustrating the bench and taken generally along line 9—9 of FIG. 8.

With primary reference directed now to FIG. 8 and 9, two separate spaced apart cubicle modules 67 are illustrated. Each has a variety of uses. They make ideal planter boxes. A plurality of stacked logs may be fastened into these configurations, or into a wide variety of different configurations as desired. Each module is formed from a plurality of layers of similarly-sized logs 20 arrayed in a square configuration as shown. The corners are again fastened with rods or dowels 55. Separate modules 67 may be coupled together by an optional wooden bench 71, that links the modules and can be used as a seat or table.

Bench 71 is generally rectangular in shape, and it is preferably formed in lengths of two, four, six and eight feet. Each bench 71 includes a plurality of parallel, elongated internal slats 75 between parallel sides 77 that terminate at both ends in suitable cross pieces 76. The cross pieces 76 are laid upon the upper faces 79 (FIG. 8) of each module 67. Providing an adequate recess exists within the orifice 51, the bench may be fastened with a suitable cap 73 optionally including a shank 81 of increased length from that used in cap 58 previously described. Optionally the benches may be fastened with the rods or dowels already described, and they must be driven into the ground enough to provide clearance for the caps. Because ends 76 of the bench are ideally dimensionally matched to the lengths of logs 20, an ideal mate is provided. Aesthetics are further enhanced by the decorative caps 3 which seal the joint.

Figure 12:
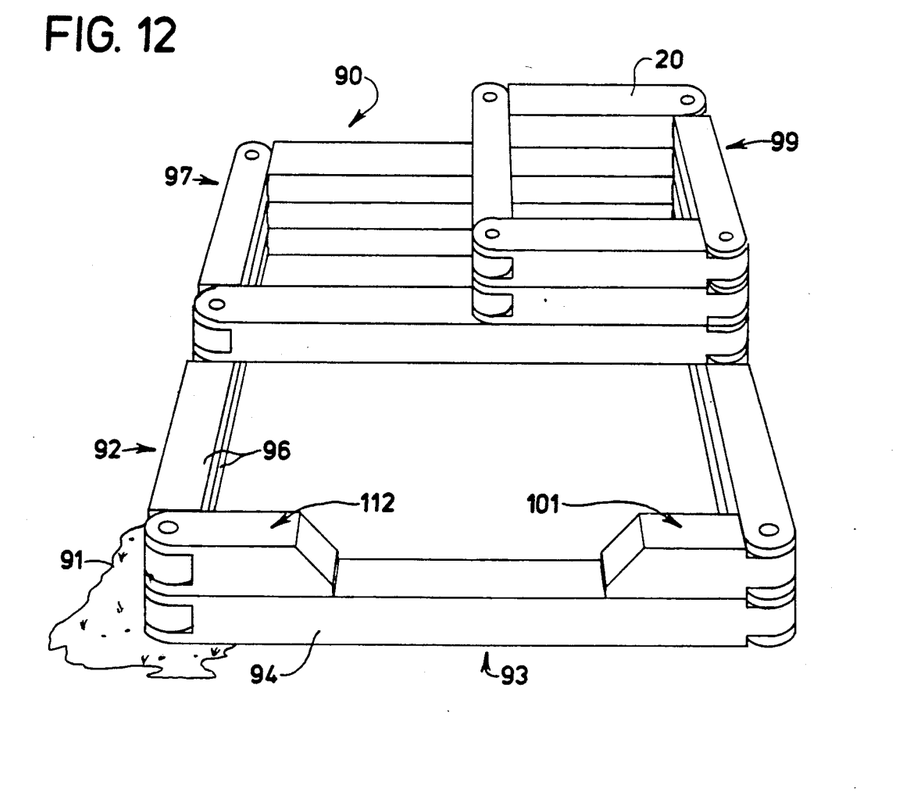
FIG. 12 is an isometric view of an alternative multi-section planter module constructed in accordance with the invention, showing but one of many ways in which male and female end caps can be employed.

With reference to FIG. 12, a relatively complex module installation has been generally designated by the reference numeral 90. Structure 90 includes a base module, generally designated by the reference numeral 92, which lies upon the ground 91. Its front 93 may consist of one or more preferably eight foot logs 94 joined in the manner previously described to rearwardly projecting side portions formed of four-foot landscape logs 96. Logs 96 are similarly doweled to an adjacent section 97 that comprises an elevated cubicle sub-section 99 similar to the individual modules 67 of FIG. 8. Terminator logs 101, 112 disposed at the front of the module 90 on log 94 provide a reduced height entryway into the module. Where for example, the module is used as an enclosure, convenient and safe ingress and egress are provided over log 94 between terminators 101, 112. Structure 90 illustrates the diversity of design to which the system logs and components may be put. Separate module subportions may be combined.

Figure 6:
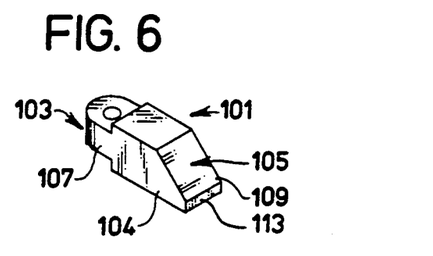
FIG. 6 is an isometric view of a preferred male terminator log.
Figure 7:
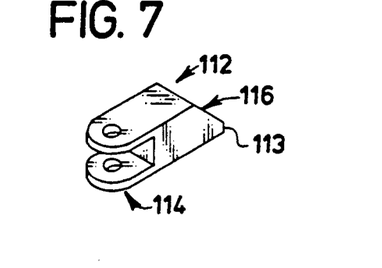
FIG. 7 is an isometric view of a preferred female terminator log.

With reference to FIGS. 6 and 7, terminator logs used by our system are configured differently at a terminal end than logs 20 described previously. A male terminator has been generally designated by the reference numeral 101. Preferably it comprises a shortened main body portion 104 terminating in a flanged male end 103 and a spaced apart wedged end 105. Male end 103 is similar to the male ends 44 discussed previously. The male flange portion 107 may be fitted into the female log flanged end discussed previously. The wedged end 105 includes a sloped terminal surface 109 that abuts a vertically oriented planar surface 113, together forming a gradual terminus pleasing to the eye. The female terminator 112 comprises a flanged, female end 114 similar to female ends 42 previously discussed. It includes a terminating wedged end 116. Female end 114 may be joined to any of the male ends discussed above. The male and female terminators are useful for forming transitions, as seen in FIG. 12, wherein they have been vertically stacked upon the forwardmost log 94 in the arrangement. When fences or borders are formed from the various logs, the end caps provide esthetically pleasing ends, and they have a variety of other functional and aesthetic uses.

Figure 13:
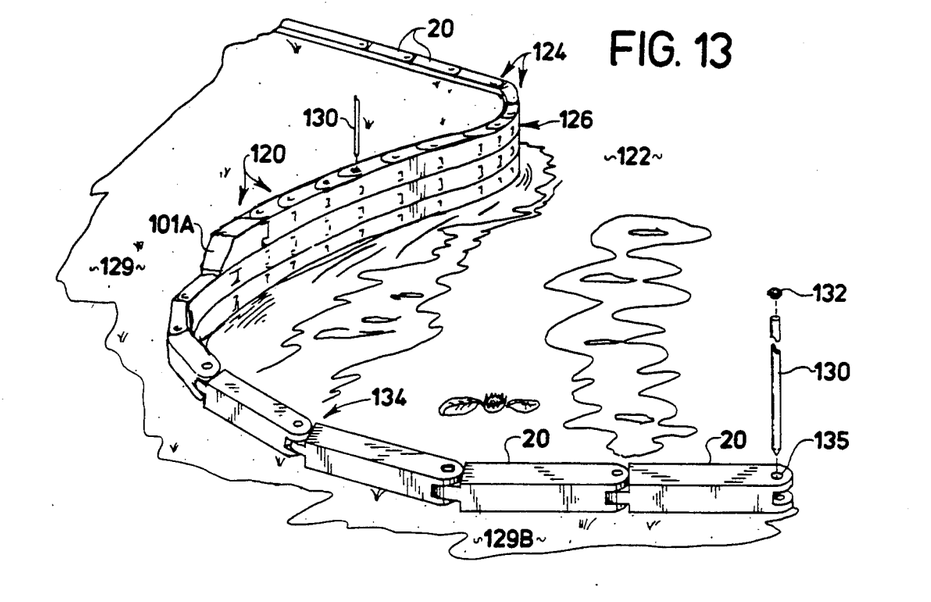
FIG. 13 is a partially exploded, fragmentary pictorial view illustrating a retaining wall constructed through our deployment of our modular system adjacent a shoreline.

With primary reference now directed to FIG. 13, a shoreline region 120 adjacent a body of water 122 has been provided with a retaining wall generally designated by the reference numeral 124. Retaining wall 124 can be conformed to the irregular boundary between the land and the water, and it includes adaptations provided by each of the features of the invention. The higher region 126 of the retaining wall includes multiple, coupled sections comprising three layers of logs 20 of various sizes. Each of the joints formed have been braced by suitable steel spikes 130 that extend beneath the water into the ground. Region 129B is lower than region 129. As the ground slopes downwardly, a terminator 101A (identical with terminator 101 in FIG. 6), terminates the highest row of logs in wall region 126. As the retaining wall curls towards the viewer (FIG. 13), wall section 134 reduces to two layers of logs 20, according to the design undertaking of the installer. Thus through the construction disclosed, retaining walls of multiple layers may be formed, and these retaining walls may conform both horizontally and vertically to the terrain. Blunt terminations of uncoupled flanges are avoided by the terminators. As explained hereinafter, terminators can be employed beneath the walls of logs to further accommodate a particular array to uneven terrain.

Because of the flanged interconnection shown, the walls, fences and retaining systems of serpentine configurations can easily be made. At the same time the system adapts for regions and ground of different terrain, and terminators are used to both functionally and esthetically accommodate regions 129 of varying slope. It is also preferred that decorative sealing caps 132 be placed over the spikes 130 through inter orifices 135 to properly complete the structure.

Figures 14, 19:
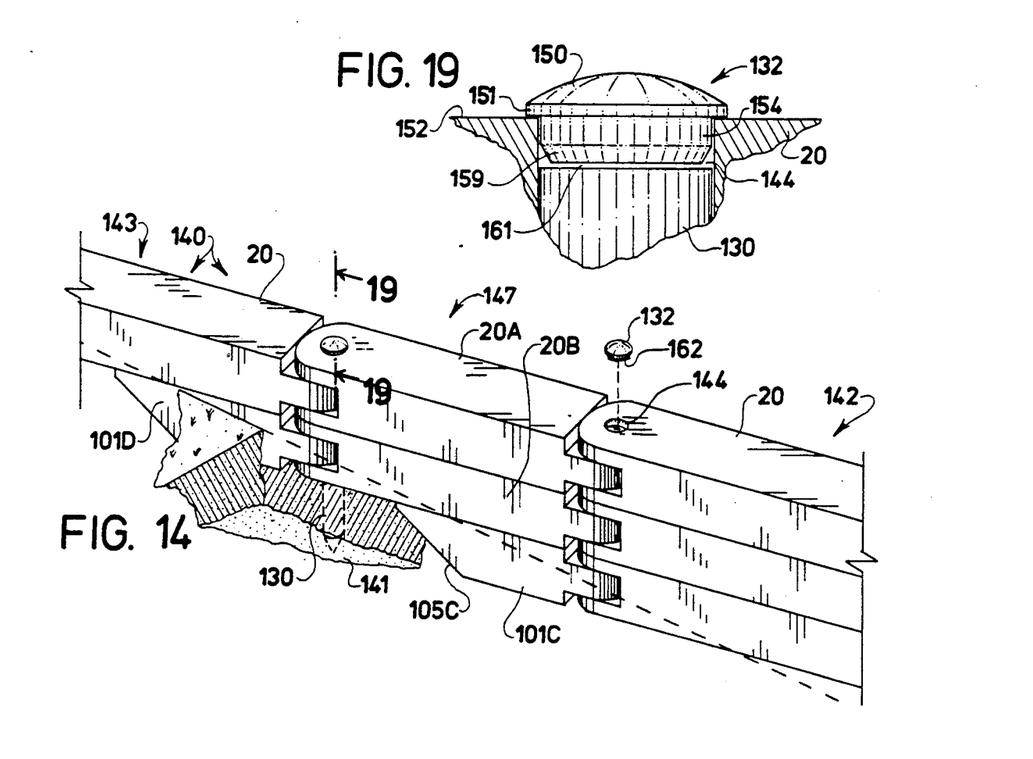

As viewed in FIG. 14, the undersides of a typical fence or retaining wall portion 140 may similarly be adapted to confront ground 141 of irregular terrain. Here a plurality of logs 20 is coupled as before, but section 142 (i.e., to the right of FIG. 14), comprises three logs, whereas section 143 (all the way to the left of FIG. 14), reduces to one single log. For this purpose two logs 20A and 20B are used in intermediate section 147, and at their bottom a terminator 101C provides a transition. A stake 130 driven through aligned flanges joins the logs as before, and a decorative cap 132 is installed in the exposed orifices 144. Terminator 101C projects its wedged shaped face 105C (i.e., similar to surface 105 in FIG. 6), towards the rising, irregular terrain 141 to provide a gradual sloping transition. Similarly, section 143 includes only one upper log, but has a lower terminator 101D to gradually conform to the rising ground 141. The upper surfaces of the three coupled wall sections are thus maintained substantially parallel, and aesthetically extreme inclines are avoided.

The cap 132 (FIG. 19) preferably comprises an upper convex, exposed outer surface 150 projecting upwardly from a rim 151 that overlies the surface 152 of the log 20 to exclude rainwater from the corner or joint. The shaft 154 may be glued within the orifice 144. Installation of cap 132 is aided by the beveled shoulder 159 which projects toward the spike 130. There is usually a small gap 161 between the bottom 162 (FIG. 14) of the cap 132 and the top of the spike 130 that may be filled with glue.

Figure 15:
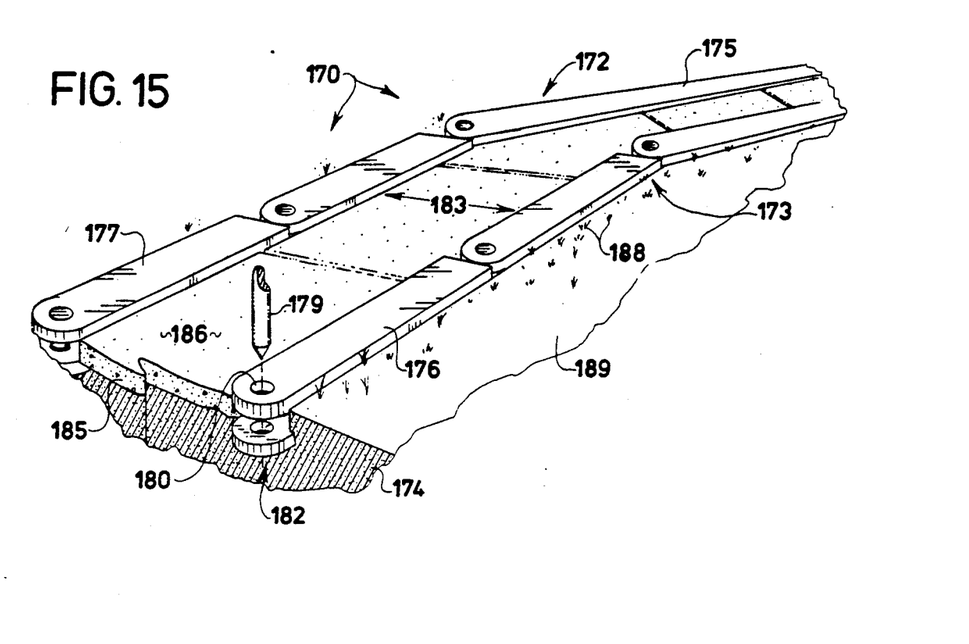
FIG. 15 is a fragmentary, perspective view illustrating landscape edging, wherein spaced apart rows of interconnected landscape logs form a border for a sidewalk.

FIG. 15 illustrates one mode of a landscape edging system 170. Edging system 170 comprises two horizontally disposed rows 172, 173 that are include serially connected, half buried logs. Corresponding logs in the two rows are generally parallel with one another. They may be installed in suitable tracks dug within ground 174. In this instance many of the individual logs 175, 176, 177 will be longer than the standard four foot logs 20 previously discussed. As before, rigid rods 179 are driven through the aligned orifices 180 in the flange sections 182 to couple the logs together in a desired angular orientation. The region 183 between the rows 172, 173 is filled with concrete or asphalt 185 to provide a suitable sidewalk 186. Surface grass 188 growing in the adjacent soil 189 will not obscure the sidewalk 186, and the boundary of grass 188 with the rows 172, 173 may be easily trimmed by the homeowner using a standard trimming implement.

Figure 16:
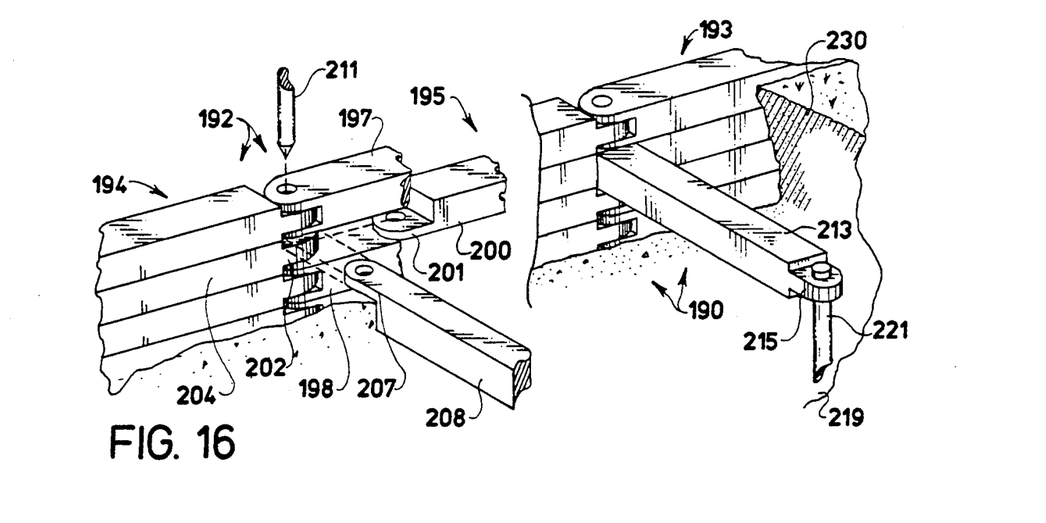
FIG. 16 is a partially exploded, fragmentary, isometric view of a typical retaining wall section illustrating the reinforcing deadman adaptation.

FIG. 16 illustrates critical deadman construction that has generally been designated by the reference numeral 190. It is contemplated that the deadman adaptation of FIG. 16 may be incorporated with the edging 170 of FIG. 15, the retaining wall 124 of FIG. 13, or the fence section 140 of FIG. 14. The deadman construction is interposed to reinforce a retaining wall against outwardly developed ground pressure. For example it may be employed in the configuration of FIG. 1, or where plastic concrete must be temporarily constrained, deadman construction will further brace the abutting sections.

The fence section 192 broadly illustrated in FIG. 16 includes serial, multi-layer sections 193, 194 that are built as aforedescribed, and which are joined by an intermediate deadman section 146. Each of the sections 193 through 195 may comprise any number of layered logs. In section 195, logs 197 and 198 are configured as before. However, one female flange of the middle log 200 has been removed, leaving only flange 201. The female end of log 208 is similarly modified, leaving lone flange 207. A simple hand saw may be used to remove the flange portions at the job site. When flange 201 is mated with the male flange 202 of log 204 space exists for the female flange portion 207 of the perpendicularly outwardly oriented deadman log 208. Thus flange portions 201 and 207 sandwich male flange portion 202 and all are held together with spike 211 driven through the aligned orifices. typical outwardly projecting deadman 213 may terminate in a male flange 215 suitably secured within the ground 219 by a stake 221. After the wall section 192 is completed, the replacement of ground 230 within the region facing the viewer will bury logs 208 and 213, but this deadman construction will stabilize the wall. The latter construction is ideal in conjunction with retaining walls of FIG. 13. Thus the adaptation in the field of the female flange members facilitates use of the deadman construction.

Figures 17, 18:
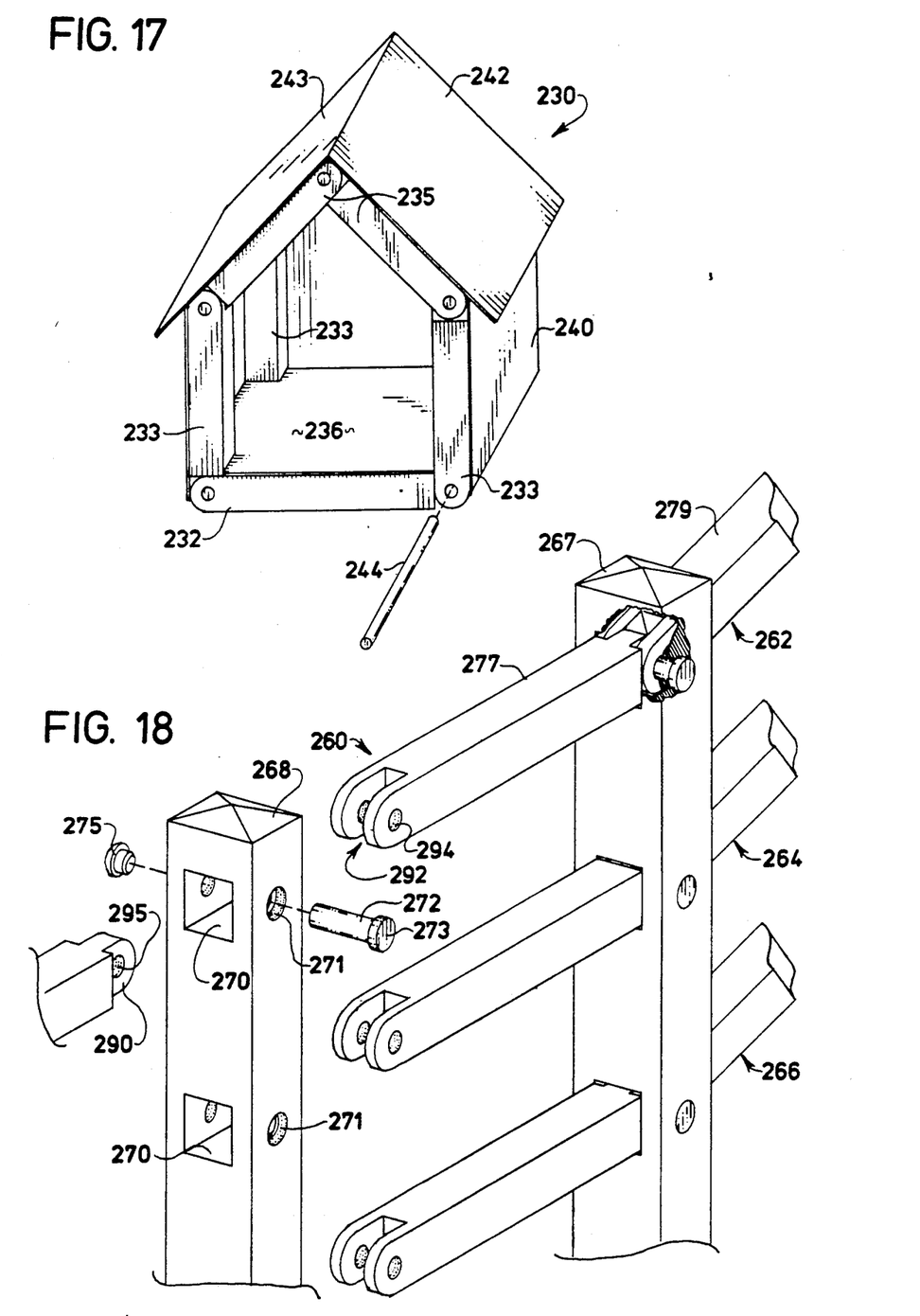
FIG. 17 is an isometric view of a typical enclosure framed by logs of the system.
FIG. 18 is a partially exploded, fragmentary isometric view of a typical fence constructed with the system; and, FIG. 19 is an enlarged, fragmentary sectional view taken generally along line 19—19 of FIG. 14.

Turning now to FIG. 17, it is also apparent that the logs may be disposed vertically to form the frame of a conventional dog house or other enclosure 230. Enclosure 230 includes a base formed of spaced apart logs 232, which are generally longer than the companion vertical logs 233 forming the sides of the apparatus and the interconnected roof frame logs 235. Each of the ends of the logs is mated together as before. Interiorly of the enclosure 230 a floor 236 having notched corners may be conveniently nailed to the base. The corner logs may receive similar planar sides 240. Roof members 242, 243 can be nailed at the appropriate incline to the roof frame supports 235. In this instance stakes are not used to form the joints. Instead, elongated wooden dowels 244 are driven between the log flanges to frictionally bind the interconnected frame logs together.

With reference to FIG. 18, it is important to be recognized that the log structures as previously described may be disposed in a configuration in which they are rotated torsionally 90 degrees. One application is that of fencing. FIG. 18 illustrates a fence system generally designated by the reference numeral 260. In this example three fence rails generally designated by the reference numerals 262, 264, and 266 are spaced apart from one another and angularly coupled at their intersection joints within vertical, spaced apart posts 267, 268. Each of the posts includes squared rail orifices 270 transversely penetrated by aligned orifices 271 into which suitable dowels 272 may be inserted to couple log ends together. These dowels may include an outer head 273 which matches the separate cap 275 disposed within the orifices 271, opposite the square orifice 270. As illustrated in FIG. 18, an individual log 277 will not be axially aligned with the outer log 279. Instead the joint illustrated enables log 279 to rise angularly upwardly from log 277. Each of the rails 262, 264, and 266 are similarly angled, and the joints are protected in the square orifices 270 in the posts 267, 268. Construction is simple because the male flange members 290 may be easily aligned within the orifices 270 and within the female flange members 292, so that dowel 272 will penetrate orifices 271, 294, and 295 to couple the fence layers together as aforedescribed.

Southern yellow pine is the preferred material for the landscape logs, the wooden dowels 55, 58, and the terminators. Preservative pressure treatment of the machined components offers significant advantages. Machining will require proper drying prior to any cutting or sizing, which also prepares the wood for proper treatment with a preservative compound such as CCA (chromated copper arsenate). There are numerous treating facilities nationwide that, having properly pressure treated the components, could offer a warranty against termites and decay for the life of the purchaser. As southern yellow pine is a notably strong wood and proper preservative treatment insures years of life for the timber logs 20 and dowels 55, the final product offers longevity significantly greater than landscaping projects constructed of railroad cross ties or peeler core landscape timbers.

Construction of a landscaping project for the home do-it-yourself person and the professional landscaping contractor begins with a careful plan and determination of the number and length of logs required to complete the plan. Once a design is selected, the entire unit may be stacked in one layer at a time until all the layers are in place. The joint pin dowels may be cut into a length that will extend through all the layers into the ground. The exact placement of the module may be adjusted before driving the joint pin dowels in the ground to anchor the unit. Afterwards the joint pin dowels are simply driven in. The logs 20 may be linked into a circular fashion in virtually any number to gain a desired size. Bordering may take a curved shape in either an "open-ended" type or as a "closed loop" in a multitude of straight and curved designs. In each case, the entire project can be laid up a layer at a time to its final form before inserting and driving the joint pin dowels.

From the foregoing, it will be seen that this invention is one well adapted to obtain all the ends and objects herein set forth, together with other advantages that are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. A modular landscaping system comprising:
   a plurality of landscaping logs of varying lengths adapted to be combined together longitudinally and fastened to one another to form a desired structure comprising a top, a bottom, and one or more layers of logs, each of said landscaping logs comprising a longitudinal axis and:
   a central body generally in the form of a parallelepiped having a generally square vertical cross section;
   a female end comprising a pair of spaced-apart, radiused, external flanges with a receptive notch defined therebetween, aligned orifices being defined in said flanges, wherein said notch internally abuts said central body and terminates in a flat surface that occupies a plane perpendicular to the longitudinal axis of the log;
   a spaced apart male end comprising a radiused male flange adapted to be received within said receptive notch, said male flange comprising an orifice adapted to be aligned with said aligned orifices in said external flanges;
   rod means adapted to be driven through said orifices for pivotally fastening said logs and said layers together and thereby establishing a joint; and,
   decorative cap means adapted to be inserted in one of said orifices in said system top for occluding said rod means form view and sealing out foreign objects and water from said joint, said cap means comprising a beveled shoulder at its lower extreme to facilitate insertion;
   terminator log means for forming a smooth transition at the end of one of said last mentioned landscape logs, each terminator log means terminating in a spaced apart wedged end for physically contacting a similarly angled portion of ground when said terminator log means is disposed at said bottom of said system.

2. The system as defined in claim 1 including bench means for extending between adjacent modules formed by said logs for establishing a platform therebetween, said bench means comprising bench orifices adapted to be aligned with said last mentioned orifices and pinned by said rod means.

3. The system as defined in claim 2 wherein the male and female flanges each comprise an extreme outermost radius point and they are radiused 90 degrees to the left and the right of said radius point.

4. A custom configurable modular wall comprising:
   a plurality of landscaping logs of at least one length adapted to be combined together longitudinally and fastened to one another to form one or more stacked layers comprising said wall, each of said landscaping logs having a longitudinal axis and, comprising:
   a central body generally in the form of a parallelepiped having a generally square vertical cross section;
   a female end comprising a pair of spaced-apart, radiused, external flanges with a receptive notch defined therebetween, aligned orifices being defined in said flanges;
   a spaced apart male end comprising a radiused male flange adapted to be received within said receptive notch, said male flange comprising an orifice adapted to be aligned with said aligned orifices in said external flanges; and,
   rod means adapted to be driven through said orifices for pivotally fastening said logs and said layers together and thereby establishing a joint and,
   dead mean means for bracing said wall, said deadman means comprising first and second landscape logs having one of said female flanges removed, the longitudinal axis of said second landscape log intersecting the longitudinal axis of said first landscape log, and said rod means fastening said first and second landscape logs together.

5. The modular wall as defined in claim 4 wherein said notch internally abuts said central body and terminates in a flat surface that occupies a plane perpendicular to the longitudinal axis of the log.

6. The modular wall as defined in claim 5 wherein the male and female flanges each comprise an extreme outer most radius point and they are radiused 90 degrees to the left and the right of said radius point.

7. The modular wall as defined in claim 4 including decorative cap means adapted to be inserted in said orifices for occluding said rod means from view and sealing out foreign objects and water.

8. The modular wall as defined in claim 4 further comprising terminator log means attachable to the end of said last mentioned landscape logs either at the top of said wall or at the bottom of said wall for adapting to irregular terrain, said terminator log means comprising a flanged end and a spaced-apart unflanged wedged end for matingly abutting angularly inclined ground when the terminator log means is disposed beneath the wall.

9. A multi-layer, landscaping structure comprising:
   a plurality of interconnected sections formed from multiple layers of landscape logs stacked to a desired height, said sections coupled together at regular intervals to form corners or joints, each landscape log comprising a longitudinal axis and:
   a central body generally in the form of a parallelepiped having a generally square vertical cross section;
   a female end comprising a pair of spaced-apart, radiused external flanges with a receptive notch defined therebetween, aligned orifices being defined in said flanges; said notch internally abutting said central body and terminating in a flat surface that occupies a plane perpendicular to the longitudinal axis of the log;
   a spaced apart male end comprising a radiused male flange adapted to be received within said receptive notch, said male flange comprising an orifice adapted to be aligned with said aligned orifices in said external flanges;
   said male and female flanges each comprising extreme outermost radius point and being radiused 90 degrees to the left and the right of said radius point;
   rod means adapted to be driven through said orifices for securing the corners and joints and firming said structure to the ground;
   decorative capping button means adapted to be inserted in said orifices for occluding said rod means from view and sealing out foreign objects and water from said joints, said capping button means comprising a beveled lower extreme to facilitate insertion; and,
   wherein a first section and a second section are substantially coupled together at a first angle relative to each other, and a deadman section is coupled to one of said first or second sections, said deadman section having a longitudinal axis intersecting both of said first and second sections.

10. A multi-layer, polygonal landscaping module having a top, a bottom, and a plurality of walls, said module comprising:
    a plurality of landscape logs having a longitudinal axis and combined together at regular angular intervals to form corners and layered upon each other to form a desired module height, each log comprising:
    a central body generally in the form of a parallelepiped having a generally square vertical cross section;
    a female end comprising a pair of spaced-apart, radiused external flanges with a receptive notch defined therebetween, aligned orifices being defined in said flanges;
    a spaced apart male end comprising a radiused male flange adapted to be received within said receptive notch, said male flange comprising an orifice adapted to be aligned with said aligned orifices in said external flanges;
    rod means adapted to be driven through said orifices for securing the corner and firming said module to the ground;
    decorative cap means adapted to be inserted in said orifices for occluding said rod means from view and sealing out foreign objects and water from the joint formed thereby, said cap comprising a beveled shoulder at its lower extreme to facilitate insertion; and,
    terminator log means attachable to the top of said module for providing a smooth transition between walls of different numbers of layers or attachable to the bottom of said module for adapting to irregular terrain by matingly abutting angularly inclined ground.

11. A modular landscaping system comprising:
    a plurality of landscaping logs of at least one length adapted to be combined together longitudinally and fastened to one another to form a desired structure comprising one or more layers and one or more modules, each of said landscaping logs comprising:
    a central body generally in the form of a parallelepiped having a generally square vertical cross section;
    a female end comprising a pair of spaced-apart, radiused, external flanges with a receptive notch defined therebetween, aligned orifices being defined in said flanges, said notch internally abutting said central body and terminating in a flat surface that occupies a plane perpendicular to the longitudinal axis of said log, said flanges comprising an extreme outermost radius point, and said flanges radiused 90 degrees to the left and the right of said radius point;
    a spaced apart male end comprising a radiused male flange adapted to be received within said receptive notch, said male flange comprising an orifice adapted to be aligned with said aligned orifices in said external flanges, said flange comprising an extreme outermost radius point, said flange radiused 90 degrees to the left and the right of said radius point;
    rod means adapted to be driven through said orifices for pivotally fastening said logs and said layers together and thereby establishing a joint;
    a plurality of decorative caps adapted to be inserted in said orifices for occluding said rod means from view and sealing out foreign objects and water from said joint; and,
    terminator log means for forming a smooth transition at the end of one of said last mentioned landscape logs by flushly abutting irregularly shaped ground contours, each terminator log means comprising a flanged male or female end similar to the male or female ends of said landscaping logs and a spaced apart wedged end.

12. The system as defined in claim 11 including rigid bench means for extending between adjacent modules formed by said logs for establishing a stable platform therebetween for the support of persons or objects.

13. A custom configurable modular wall comprising:
a plurality of landscaping logs of at least one length adapted to be combined together longitudinally and fastened to one another to form one or more stacked layers comprising said wall, each of said landscaping logs comprising:
   a central body generally in the form of a parallelepiped having a generally square vertical cross section;
   a female end comprising a pair of spaced-apart, radiused, external flanges with a receptive notch defined therebetween, aligned orifices being defined in said flanges, said notch internally abutting said central body and terminating in a flat surface that occupies a plane perpendicular to the longitudinal axis of said log, said flanges comprising an extreme outermost radius point, and said flanges radiused 90 degrees to the left and the right of said radius point, said flanges laterally defined within the plane of each side of said body;
   a spaced apart male end comprising a radiused male flange adapted to be received within said receptive notch, said male flange comprising an orifice adapted to be aligned with said aligned orifices in said external flanges, said flange comprising an extreme outermost radius point, said flange radiused 90 degrees to the left and the right of said radius point, said flange laterally defined within the plane of each side of said body;
   rod means adapted to be driven through said orifices for pivotally fastening said logs and said layers together and thereby establishing a joint;
   terminator log means attachable to the end of said landscape logs either at the top of said wall or at the bottom of said wall for adapting to irregular terrain, said terminator log means comprising a flanged end adapted to be coupled to said logs and a spaced-apart unflanged wedged end, which, when the terminator is disposed beneath the wall, matingly abuts angularly inclined ground; and,
   dead man means for bracing said wall.

14. The modular wall as defined in claim 13 wherein said deadman means comprises a first landscape log having one of said female flanges removed and a second landscape log with a female flange removed, said second landscape log occupying an axis intersecting an axis of said first landscape log, and said rod means fastening said first and second landscape logs together.

15. The modular wall as defined in claim 14 including decorative caps adapted to be inserted in one of said orifices for occluding said rod means from view and sealing out foreign objects and water from said joint, said cap comprising a beveled shoulder disposed at a lower extreme of said cap.

16. A multi-layer, landscaping structure comprising:
a plurality of interconnected sections formed from multiple layers of landscape logs stacked to a desired height, said sections coupled together at regular intervals to form corners or joints, each landscape log comprising:
   a central body generally in the form of a parallelepiped having a generally square vertical cross section;
   a female end comprising a pair of spaced-apart, radiused, external flanges with a receptive notch defined therebetween, aligned orifices being defined in said flanges, said notch internally abutting said central body and terminating in a flat surface that occupies a plane perpendicular to the longitudinal axis of said log, said flanges comprising an extreme outermost radius point, said flanges radiused 90 degrees to the left and the right of said radius point, said flanges laterally defined within the plane of each side of said body;
   a spaced apart male end comprising a radiused male flange adapted to be received within said receptive notch, said male flange comprising an orifice adapted to be aligned with said aligned orifices in said external flanges, said flange comprising an extreme outermost radius point, said flange radiused 90 degrees to the left and the right of said radius point, said flange laterally defined within the plane of each side of said body;
   rod means adapted to be driven through said orifices for securing the corners and firming said structure to the ground;
   decorative capping button means adapted to be inserted in one of said orifices for occluding said rod means from view and sealing out foreign objects and water from said joint, said button means comprising a beveled base; and,
   wherein a first section and a second section are substantially coupled together at a first angle forming a joint, and a deadman section is coupled to one of said first or second sections at a second angle which intersecting both of said first and second sections.

17. A custom configurable, modular, multi layer landscaping module comprising ak plurality of sides, at least one side having fewer layers than the other sides, said module adapted to be erected at a job site upon ground of regular or irregular elevation, said module comprising:
   a plurality of interconnectable landscaping logs of at least one length adapted to be combined together longitudinally in rows and stacked horizontally upon one another in layers for forming said sides and thus said module, each of said landscaping logs comprising:
      an elongated, central body generally in the form of a parallelepiped having a generally square vertical cross section;
      a female end comprising a pair of spaced-apart, radiused, external flanges with a receptive dap defined therebetween and aligned orifices defined in said flanges, said dap internally abutting said central body and terminating in a flat surface that occupies a plane perpendicular to the longitudinal axis of said log, said flanges comprising an extreme outermost radius point, said flanges radiused 90 degrees to the left and the right of said radius point, said flanges laterally defined within the plane of each side of said body; and,
      a spaced apart male end comprising a radiused male flange adapted to be received within said receptive dap, said male flange comprising an orifice adapted to be aligned with said aligned orifices in said external flanges, said flange comprising an extreme outermost radius point, said flange radiused 90 degrees to the left and the right of said radius point, said flange laterally defined within the plane of each side of said body;

rod means adapted to be driven through said orifices for pivotally fastening said logs and said layers together and thereby establishing a joint;

at least one side having fewer layers than the other sides;

a plurality of terminator logs having a flanged end adapted to be coupled to one of said landscaping logs and an opposite, spaced apart, uncoupled wedged end, said terminator logs adapted to be installed in an uppermost layer of said module for forming a smooth transition at the end of one of said last mentioned landscape logs upon said at least one side having fewer layers than the other sides, and adapted to be installed in a lowermost layer of at least one of said module sides for physically contacting a similarly profiled portion of said irregular ground when said terminator log means is disposed at said bottom of said module.

18. The system as defined in claim 17 including decorative caps adapted to be inserted in one of said orifices for occluding said rod means from view and sealing out foreign objects and water from said joint, said cap comprising a beveled shoulder disposed at a lower extreme of said cap.

19. The system as defined in claim 17 including rigid bench means for extending between adjacent modules formed by said logs for establishing a stable platform therebetween for the support of persons or objects.

* * * * *